UNITED STATES PATENT OFFICE.

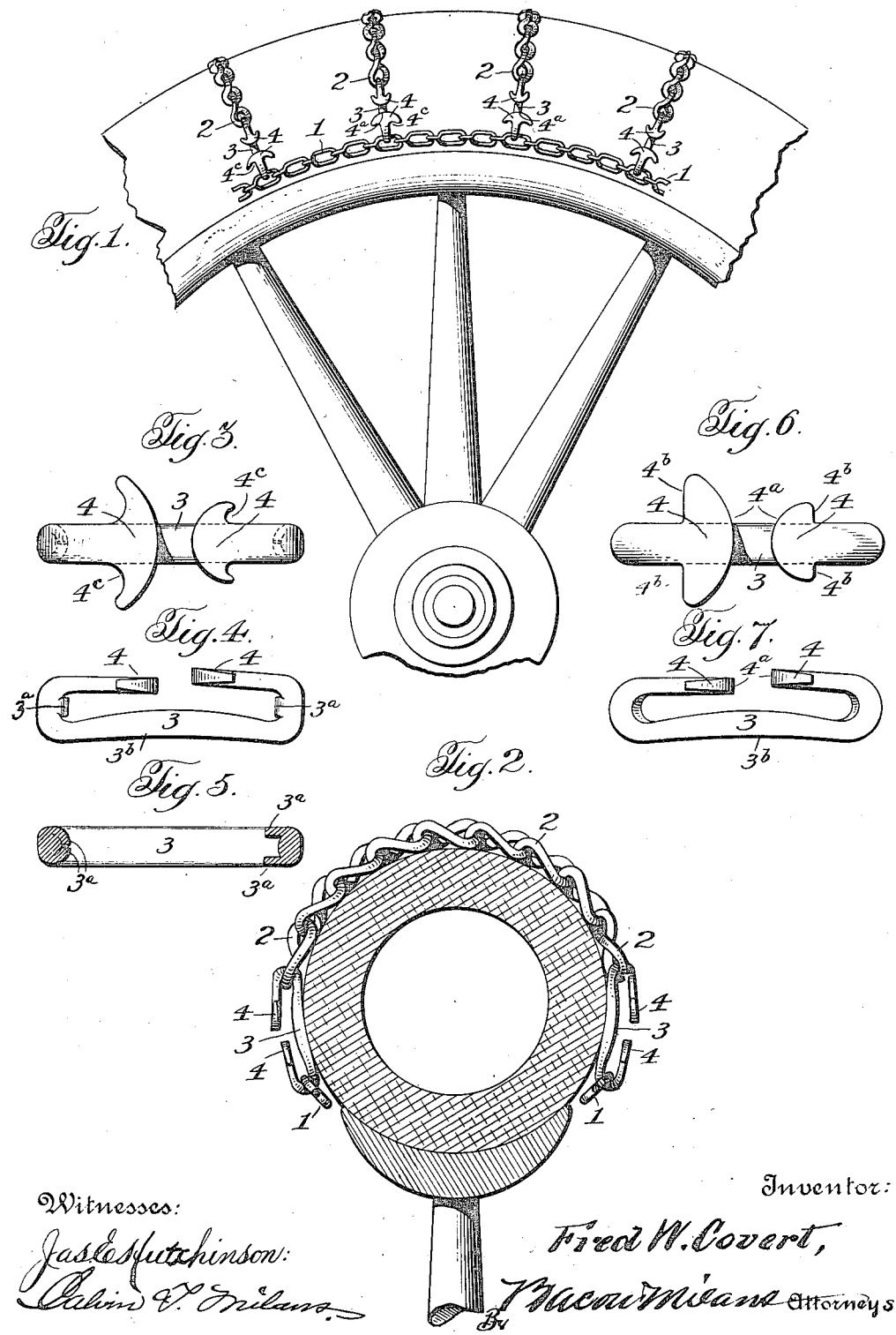

FRED W. COVERT, OF WATERVLIET, NEW YORK, ASSIGNOR TO COVERT MANUFACTURING COMPANY, OF WATERVLIET, NEW YORK, A CORPORATION OF NEW YORK.

COUPLING MEMBER FOR CHAINS.

1,060,744. Specification of Letters Patent. Patented May 6, 1913.

Application filed November 9, 1910. Serial No. 591,502.

*To all whom it may concern:*

Be it known that I, FRED W. COVERT, a citizen of the United States, residing at Watervliet, in the county of Albany and State of New York, have invented certain new and useful Improvements in Coupling Members for Chains, of which the following is a specification, reference being had therein to the accompanying drawing.

The present invention relates to improvements in coupling means for chains and more particularly for chains used as anti-skidding devices for vehicle tires, embodying connected chain sections, usually a pair of oppositely arranged rim chain sections and separated cross or tread chain sections.

It is a matter of common knowledge that the various sections of a chain of this character will not wear alike, and it often times becomes necessary, because of the usual rigid connection between the cross sections and rim sections of the chain, when a cross section becomes damaged or broken, to replace the entire device, or else ship the same to the factory or repair shop so as to have a new cross section put in to take the place of the damaged one, and it is proposed by the present invention to provide a novel and efficient coupling member between the various sections of the device, whereby the cross sections of the chain, will be positively held against accidental separation, while at the same time they may be readily removed from the rim sections of the chain and replaced by the operator at will.

In carrying out the invention, I make use of a simple and inexpensive form of coupling member and one which accomplishes the purposes of the invention in a highly efficient manner.

More particularly the invention includes a coupling member, between the chain sections of an anti skidding device, of unitary or integral construction, the said coupling member having locking devices at its respective ends adapted to detachably engage respectively the cross and rim chains of the device.

Embodiments of the invention are shown in the accompanying drawings for the purpose of illustration though the invention is not presumed to be limited to the devices illustrated.

In the drawings, which form a part hereof Figure 1 is a side elevation of a section of the vehicle wheel tire with my improvements applied, Fig. 2 is a transverse section of the tire with the improvements applied, Figs. 3, 4 and 5 are enlarged detail views of one form of device for securing together the rim chains and cross chains, and Figs. 6 and 7 are similar views of a slightly modified construction.

Referring now more particularly to the drawings wherein like reference numerals refer to corresponding parts throughout the several views of the drawings 1 designates oppositely disposed chain members, each of which members may be made in sections coupled together in any desired manner but which are shown in the present instance as being continuous or endless. These chains 1 are usually styled rim chains since when in position upon a tire, they occupy a position adjacent the side rims of the wheel and adjacent the base of the tire, whereby when the tire is inflated the chains will be held in place. Cross chains 2 extend between the rim chains at separated points thereabout the links of the cross chains being preferably comparatively heavy and twisted so as to better withstand wear and to present a roughened tread to prevent skidding, while the links of the rim chains may be comparatively flat and of light weight.

A novel form of coupling member is provided to detachably connect the ends of the cross chains to the rim chains, the same comprising a body or intermediate portion 3 with return portions at the ends of the intermediate portion 3, which return portions are conveniently integral return bent portions slightly offset from the body portion as shown, and said return bent portions terminating in locking head members 4 preferably integral with the return bent portions and extending transversely to the body portion. These head members conveniently take the form of arrow heads as shown. That form illustrated in Figs. 6 and 7 is curved at its outer edge 4$^a$ and connects with the return bent portion of the body part by straight inner edges 4$^b$. In the preferred form, however, illustrated in Figs. 3 and 5, the curved outer edge of the head connects by somewhat similar curved inner edges 4$^c$ with the return bent portion of the body member thereby forming seats and facilitating the assembling of the hook member on the chains. In both illustrations however, the head at one end of the coupling member is preferably larger than that head at the opposite end thereof, for a purpose to be presently described.

In the use of these chains or anti-skidding devices upon the tires considerable lateral play or vibration occurs, due to the treading action of the cross chains, at the point of connection between the cross chains and the rim chains, and the particular form of coupling member provided by me, prevents any accidental separation of the cross chains from the rim chains by such creeping or relative vibration of the parts.

In the application of the cross chains to the rim chains, through the medium of my improved coupling member, the operator takes the coupling member and threads the small head at one end thereof through one of the flat links of the rim chain, it being observed that the smaller head is of a size readily insertible in said link. Thereupon the coupling member is drawn through the said link until the offset portion of the return bent portion of the enlarged head contacts with the said link. It is noted that the enlarged head affords an effective retaining or locking means between the coupling member and link, since the head is preferably of a size as to prevent separation from said link, except through the separation of the smaller head at the opposite end of the coupling member. Therefore regardless of the amount of play or vibration the parts of the chains may be subjected to, the coupling member will not become accidentally separated. After having placed the coupling member into locking engagement with a link of the rim chain, the operator thereupon inserts the smaller head of the coupling member into locking engagement with one of the end links of the cross chains. It is noted that the longitudinal axis of the cross chain links is transverse to the same axis of the rim chain links or across the tire, so that to engage the smaller head of the coupling member with a link of the cross chain, it is necessary to turn either the coupling member, or the cross chain link at an angle to its normal position, whereby the head may be readily inserted directly into the opening of the cross chain link. When so inserted, the coupling member or cross chain link, according to which has been moved out of the normal position, is turned or righted, when the said extensions of the head will assume a position transverse to the longitudinal axis of the link and overlie the adjacent sides of the link, and will be firmly locked against accidental separation since to become separated it would be necessary to move the coupling member at substantially right angles to the longitudinal axis of the cross chain links, and then remove the neck or return bent portion of the coupling member with its head from the link. This it will be appreciated is practically impossible, when the device is in position and in use upon an inflated tire. To withdraw the coupling member so as to remove one of the cross chain sections, the reverse of the above noted operation takes place, namely the smaller head is first removed from the cross chain link by moving the same at substantially right angles to the longitudinal axis of the link, and then by threading said smaller head through the link of the rim chain said coupling member becomes entirely separated and may be utilized as the coupling member for a new cross chain section. The curved outer edges of the head assist in the ready assembling and disassembling of the parts.

From the above, it will be obvious that it is only necessary for the operator to carry one or more cross chain sections in the usual repair kit of a motor vehicle, and as one of the cross chain sections of the anti-skidding devices becomes damaged, instead of replacing the entire device, simply to remove the damaged cross section through the medium of the detachable coupling above described, and to replace said removed chain section by one of the auxiliary ones, in the manner specified.

Of course it is obvious that the rim chains may have a releasable or adjustable connection of any of the approved types intermediate their ends whereby to readily permit the attachment to the tire when the latter is in an inflated condition, but as this is well known in the art and is not specifically claimed herein it is not deemed necessary to illustrate such a construction.

As previously described the coupling member is engaged with the rim, and cross, chain respectively by threading the smaller head 4 through the adjacent links of said chains, and to facilitate the application of the device, said smaller head 4 is arranged at a different horizontal plane from the relatively large head, as more clearly illustrated in Figs. 4 and 7. It is obvious that in the application of the coupling member the smaller head of the same may be readily engaged with the desired link, without any hindrance of the enlarged head.

The coupling member conveniently has a raised or thickened portion intermediate the ends of the body part thereof, as clearly illustrated in Figs. 4 and 7, to assist in retaining the engaged links of the chains adjacent the ends of the coupling members and it will also be noted that the rear surface of the body member is curved at 3$^b$, whereby to more readily conform to and snugly fit about the periphery of the tire as clearly illustrated in Fig. 2. Again, the said coupling member is conveniently reinforced at the bend thereof at opposite ends as by forming integral projections 3ᵃ, as shown at that end of Fig. 5 to the right, which integral projections are adapted to be upset as shown in the same figure at that end to the left thereof. This reinforcing characteristic is an important feature of the invention because of the constant wear and straining action of the engaged links of the chains with the coupling member at the bends thereof.

What I claim is:

1. A coupling member for detachably connecting chain links or the like, comprising an intermediate part and laterally extending end hooks, one of which is larger than the other.

2. A coupling for chains or the like comprising a body portion and ends extending back upon the body portion and terminating in transversely extending heads, one of said heads being longer than the other and arranged in a different plane.

3. A coupling member for chains comprising a body part, the rear surface of which curves outwardly toward its ends and said body part, terminating at opposite ends in arrow heads.

4. A detachable coupling member for chains having adjacent links, the same comprising a body part having at opposite ends thin flat heads, which said heads are offset laterally with respect to the body part, and each of which said heads have side extensions projecting beyond the sides of the body part, the said heads being adapted to engage adjacent links of the chain.

5. A coupling member for detachably and adjustably connecting chains having links of different sizes comprising a body part terminating in offset portions having arrow heads, one of said heads being longer than the other substantially as and for the purpose described.

6. A coupling for chains or the like comprising a body part and ends extending back upon the body part and terminating in transversely extending thin flat heads each of which is substantially in the plane of the connected end portion.

7. A coupling for chains or the like comprising a body portion and ends extending back upon the body portion and terminating in transversely extending heads, the body portion having a substantially continuous rear surface free from projections and a raised inner surface below the space between the respective heads.

8. A coupling member for chains comprising a body part of bendable metal having return bent portions at its opposite end terminating in arrow heads, one of which heads is larger than the other.

9. A coupling member for chains comprising a body part of bendable metal having return bent portions at its opposite end terminating in arrow heads, one of said heads being larger than the other.

10. In a chain construction, chains each having a plurality of link members, and a coupling comprising a body part having integral laterally extending locking hook parts at its opposite ends for detachably engaging said links, one of said parts being longer than the other.

11. In a chain construction, links, a coupling member comprising a body part having locking projections at its opposite ends, one of said projections being smaller than the other whereby it is adapted to pass through one of said links so as to bring the other enlarged projection into locking engagement with said link, and said first mentioned projection being adapted to be inserted into locking engagement with another link.

12. A coupling member for cross chains comprising a body part having offset transversely extending arrow heads at its respective ends, the base of said heads having curved recessed portions connecting with the body part.

13. In a chain construction, a coupling member for adjacent links, a body portion and ends extending back upon the body portion and terminating in transversely extending heads, one of said heads being in a different plane from the other head.

14. In a chain construction, a member for detachably connecting adjoining links comprising a body portion, and ends bent back upon the body portion and terminating in transversely extending heads one of which is longer than the other and said member being reinforced at its ends.

In testimony whereof I affix my signature in presence of two witnesses.

FRED W. COVERT.

Witnesses:
J. H. Hirst,
George H. Lee.